(12) United States Patent
Gesbert et al.

(10) Patent No.: US 7,191,381 B2
(45) Date of Patent: Mar. 13, 2007

(54) MODE LOOKUP TABLES FOR DATA TRANSMISSION IN WIRELESS COMMUNICATION CHANNELS BASED ON STATISTICAL PARAMETERS

(75) Inventors: David J. Gesbert, Mountain View, CA (US); Severine E. Catreux, San Jose, CA (US); Robert W. Heath, Jr., Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 291 days.

(21) Appl. No.: 09/730,687

(22) Filed: Dec. 5, 2000

(65) Prior Publication Data

US 2002/0056066 A1    May 9, 2002

Related U.S. Application Data

(63) Continuation-in-part of application No. 09/665,149, filed on Sep. 19, 2000, now Pat. No. 6,760,882.

(51) Int. Cl.
*H03M 13/00* (2006.01)
(52) U.S. Cl. .................................... 714/759
(58) Field of Classification Search ............... 714/774, 714/704, 708, 748, 751, 759; 370/252, 345, 370/206; 375/259, 261, 267; 455/102
See application file for complete search history.

(56) References Cited

U.S. PATENT DOCUMENTS 5,559,810 A * 9/1996 Gilbert et al. ............ 714/704
5,815,488 A   9/1998 Williams et al. ........... 370/206
5,933,421 A   8/1999 Alamouti et al. .......... 370/330

(Continued)

FOREIGN PATENT DOCUMENTS

WO    WO 98/09381    3/1998

(Continued)

OTHER PUBLICATIONS

Paulraj, A., *Taxonomy of space-time processing for wireless networks*, IEE Proc—Radar Sonar Navig., vol. 145, No. 1, Feb. 1998.

*Primary Examiner*—Guy J. Lamarre
(74) *Attorney, Agent, or Firm*—Michael A. Proksch (57) ABSTRACT

A method and medium tangibly embodying the method of constructing a lookup table of modes for encoding data for transmission in a wireless communication channel from a transmit unit to a receive unit by using at least one quality parameter of the data and its first-order and second-order statistical parameters to arrange the modes in the lookup table. The first-order and second-order statistical parameters can be determined from a simulation of the wireless communication channel or from field measurements of the wireless communication channel. The modes in the lookup table are ordered by a target value of a communication parameter such as PER, BER, data capacity, signal quality, spectral efficiency, throughput or another suitable communication parameter set to achieve a desired quality of service. The quality parameter selected is conveniently a short-term quality parameter such as signal-to-interference and noise ratio (SINR), signal-to-noise ratio (SNR) or power level. During use adjustments depending on the instantaneous condition of the channel can be used to tune the lookup table.

29 Claims, 6 Drawing Sheets

U.S. PATENT DOCUMENTS

| | | | | |
|---|---|---|---|---|
| 6,044,485 A | * | 3/2000 | Dent et al. | 714/774 |
| 6,064,662 A | | 5/2000 | Gitlin et al. | 370/330 |
| 6,144,711 A | | 11/2000 | Raleigh et al. | 375/347 |
| 6,167,031 A | * | 12/2000 | Olofsson et al. | 370/252 |
| 6,175,550 B1 | * | 1/2001 | Van Nee | 370/206 |

FOREIGN PATENT DOCUMENTS

| | | |
|---|---|---|
| WO | WO 01/82521 A2 | 11/2001 |
| WO | WO 02/03568 A1 | 1/2002 |

* cited by examiner

MODE LOOKUP TABLES FOR DATA TRANSMISSION IN WIRELESS COMMUNICATION CHANNELS BASED ON STATISTICAL PARAMETERS

RELATED APPLICATIONS

This application is a continuation-in-part to application Ser. No. 09/665,149 filed on 9/19/2000 now U.S. Pat. No. 6,760,882.

FIELD OF THE INVENTION

The present invention relates generally to wireless communication systems and methods, and more particularly to the construction of mode lookup tables for encoding data for transmission in a wireless communication channel based on statistical parameters.

BACKGROUND OF THE INVENTION

Wireless communication systems serving stationary and mobile wireless subscribers are rapidly gaining popularity. Numerous system layouts and communications protocols have been developed to provide coverage in such wireless communication systems.

Wireless communications channels between transmit and receive devices are inherently variable and their quality fluctuates. Specifically, the quality parameters of such communications channels vary in time. Under good conditions wireless channels exhibit good communication parameters, e.g., large data capacity, high signal quality, high spectral efficiency and throughput. At these times significant amounts of data can be transmitted via the channel reliably. However, as the channel changes in time, the communication parameters also change. Under altered conditions former data rates, coding techniques and data formats may no longer be feasible. For example, when channel performance is degraded the transmitted data may experience excessive corruption yielding unacceptable communication parameters. For instance, transmitted data can exhibit excessive bit error rates or packet error rates. The degradation of the channel can be due to a multitude of factors such as general noise in the channel, multi-path fading, loss of line-of-sight path, excessive Co-Channel Interference (CCI) and other factors.

In mobile systems, signal degradation and corruption is chiefly due to interference from other cellular users within or near a given cell and multipath fading, in which the received amplitude and phase of a signal varies over time. The fading rate can reach as much as 200 Hz for a mobile user traveling at 60 mph at PCS frequencies of about 1.9 GHz. In such environments, the problem is to cleanly extract the signal of the user being tracked from the collection of received noise, CCI, and desired signal portions.

In Fixed Wireless Access (FWA) systems, e.g., where the receiver remains stationary, signal fading rate is less than in mobile systems. In this case, the channel coherence time or the time during which the channel estimate remains stable is longer since the receiver does not move.

Prior art wireless systems have employed adaptive modulation of the transmitted signals with the use of feedback from the receiver as well as adaptive coding and receiver feedback to adapt data transmission to changing channel conditions. Such adaptive modulation is applied to Single Input Single Output (SISO) and Multiple Input Multiple Output (MIMO) systems, e.g., systems with antenna arrays at the transmit and receive ends.

In both SISO and MIMO systems, however, the fundamental problem of efficient choice of the mode to be applied to the transmitted data remains. For general prior art on the subject the reader is referred to A. J. Goldsmith et al., "Variable-rate variable power MQAM for fading channels", IEEE Transactions of Communications, Vol. 45, No. 10, October 1997, pp. 1218–1230; P. Schramm et al., "Radio Interface of EDGE, a proposal for enhanced data rates in existing digital cellular systems", Proceedings IEEE 48th Vehicular Technology Conference (VTC'1998), pp. 1064–1068; and Van Noblen et al., "An adaptive link protocol with enhanced data rates for GSM evolution", IEEE Personal Communications, February 1999, pp. 54–63.

U.S. Pat. No. 6,044,485 to Dent et al. teaches a transmission method and system which adapts the coding of data based on channel characteristics. The channel characteristics are obtained either from a channel estimation circuit of from an error feedback signal. In particular, when the signal-to-noise (SNR) characteristic is chosen as an indicator of the state of the channel, then a different coding is applied to the data being transmitted for high and low SNR states of the channel. In addition, the encoding also employs information derived from the cyclic redundancy check (CRC).

The method taught by Dent varies the coding rate only and not the modulation rate. This method does not permit one to select rapidly and efficiently from a large number of encoding modes to adapt to varying channel conditions.

U.S. Pat. No. 5,559,810 to Gilbert et al. teaches a communication system using data reception history for selecting a modulation technique from among a plurality of modulation techniques to thus optimize the use of communication resources. At least one block of data is transmitted with a particular modulation technique and a data reception history is maintained to indicate transmission errors, e.g., by keeping a value of how many blocks had errors. The data reception history is updated and used to determine an estimate of transmission signal quality for each modulation technique. This value is then used in selecting the particular modulation technique.

The system and method taught by Gilbert rely on tracking errors in the reception of entire blocks of data. In fact, signal quality statistics, e.g., signal-to-interference and noise ratio (SINR) are derived from the error numbers for entire blocks of data, which requires a significant amount of time. Thus, this method does not permit one to select rapidly and efficiently from a large number of encoding modes to adapt to varying channel conditions, especially in the event of rapid fades as encountered in mobile wireless systems.

It would be an advance to provide an appropriately organized set of modes or a mode lookup table to allow the system to rapidly and efficiently select the appropriate mode for encoding data in a quickly changing channel. It is important that such mode lookup tables be adaptable and efficient in all wireless systems, including Multiple Input Multiple Output (MIMO), Multiple Input Single Output (MISO), Single Input Single Output (SISO) and Single Input Multiple Output (SIMO) systems as well as systems using multiple carrier frequencies, e.g., OFDM systems.

SUMMARY

The present invention provides a method of constructing a lookup table of modes for encoding data for transmission in a wireless communication channel from a transmit unit to a receive unit. In accordance with the method, at least one quality parameter of the data is selected to monitor the quality of the data as received by the receive unit. A first-order statistical parameter is then determined for the one or more quality parameters. Also, a second-order statistical parameter is determined for the one or more quality parameters. The modes are then arranged in the lookup table based on both the first-order and second-order statistical parameters. The first-order statistical parameter can be a mean while the second-order statistical parameter can be a variance of the quality parameter or parameters. The first-order and second-order statistical parameters can be determined from a simulation of the wireless communication channel or from field measurements of the wireless communication channel.

To further aid in the organization of modes in the lookup table, a communication parameter is selected and a target value of the communication parameter is set. For example, the communication parameter is an error rate, such as a bit error rate (BER) or a packet error rate (PER) of the data as received by the receive unit. The target value of the error rate can be set in accordance with the quality of service required. Any specific target value is related to the values of the first-order and second-order statistical parameters of the one or more quality parameters. In other words, a mapping or correspondence exists between the target value of the communication parameter and the first and second-order statistical parameters of the quality parameter or parameters. The modes in the lookup table are arranged based on the first and second-order statistical parameters and the corresponding target value of the communication parameter.

The communication parameter can also be a data capacity, signal quality, spectral efficiency, throughput or another suitable communication parameter. In fact, the communication parameter can also be a statistical measure of the quality of data transmission through the wireless communication channel. In other words, the communication parameter can be a statistical communication parameter such as mean packet error rate, mean bit error rate or the mean of any other selected communication parameter.

The quality parameter selected is conveniently a short-term quality parameter. In this case it is also convenient that the second-order statistical parameter be a variance of the short-term quality parameter. For example, the variance can be a temporal variance or a frequency variance and the short-term quality parameter can be a signal-to-interference and noise ratio (SINR), signal-to-noise ratio (SNR) or power level.

During use of the lookup table the selection of modes may have to be modified depending on the actual or instantaneous condition of the wireless communication channel. That is because the lookup table is constructed based on simulation of the wireless communication channel or field measurements of the wireless channel, as noted above. The target values of the communication parameter may thus no longer correspond to the first and second-order statistical parameters in the lookup table. For this reason, the method of invention further calls for measuring a measured value of the communication parameter in the wireless channel. An adjustment is assigned to at least one of the first- and second-order statistical parameters of the quality parameter, based on the difference between the measured value and target value of the communication parameter. The mode associated with these adjusted statistical parameters is then selected from the lookup table.

When transmitting the data at more than one frequency, it is useful to select frequency variance as the second-order statistical parameter. In particular, this should be done when employing a multi-carrier scheme, e.g., OFDMA, FDMA or CDMA in transmitting the data. Of course, the invention can also be used in TDMA and other transmission schemes not employing multi-carrier transmissions. Additionally, temporal variance of the quality parameter can also be calculated and used in adjusting the modes selection from the lookup table.

In accordance with the invention, the lookup table and instructions for its construction are stored in a suitable storage medium, e.g., a magnetic, magneto-optic or optic storage medium. Likewise, instructions are stored for selecting one or more quality parameters, determining their first- and second-order statistical parameters and arranging the modes in the lookup table based on these statistical parameters. The instructions further include selecting a communication parameter, setting its target value and arranging the modes based on the target value. During operation, adjustments in the selection of modes can be based on the difference between the measured value of the communication parameter and the target value.

A detailed description of the invention and the preferred and alternative embodiments is presented below in reference to the attached drawing figures.

DETAILED DESCRIPTION

Figure 1:
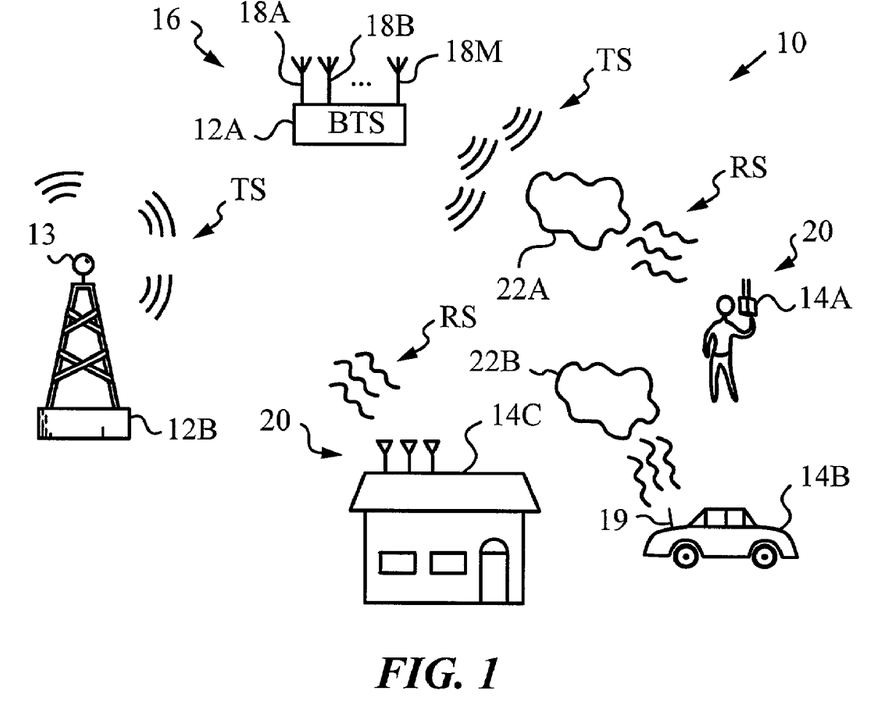
FIG. 1 is a simplified diagram illustrating a communication system in which the method of the invention is applied.

The invention will be best understood after first considering the simplified diagram of FIG. 1 illustrating a portion of a wireless communication system 10, e.g., a cellular wireless system in which the invention can be employed. For explanation purposes, downlink communication will be considered where a transmit unit 12 (12A, 12B) is a Base Transceiver Station (BTS) and a receive unit 14 (14A, 14B, 14C) is a mobile or stationary wireless user device. Of course, the method can be used in uplink communication from receive unit 14 to BTS 12.

Exemplary user devices 14 include mobile receive units such as a portable telephone 14A, a car phone 14B and a stationary receive unit 14C. Receive unit 14C can be a wireless modem used at a residence or any other fixed wireless unit. Receive units 14A and 14C are equipped with multiple antennas or antenna arrays 20. These receive units can be used in Multiple Input Multiple Output (MIMO) communications taking advantage of techniques such as spatial multiplexing or antenna diversity. Receive unit 14B has a single antenna 19 and can be used in Single Input Single Output (SISO) communications. It will be understood by those skilled in the art that receive units 14A, 14B, 14C could be equipped in SISO, MISO (Multiple Input Single Output), SIMO (Single Input Multiple Output) or MIMO configurations. For example, in FIG. 1 receive unit 14B is shown having a single antenna 19 and therefore it can be employed in SISO or MISO configurations. MISO configuration can be realized in the case of receive unit 14B, for example by receiving signals from the antenna array at BTS 12A or from a distinct BTS such as 12B, or any combination thereof. With the addition of multiple receive antennas receive unit 14B, as well as receive units 14A and 14C, could also be used in SIMO or MIMO configurations. In any of the configurations discussed above, the communications techniques can employ single-carrier or multi-carrier communications techniques.

A first exemplary transmit unit 12 is a BTS 12A equipped with an antenna array 16 consisting of a number of transmit antennas 18A, 18B, . . . , 18M for MIMO communications. Another exemplary transmit unit 12 is a BTS 12B equipped with a single omnidirectional antenna 13. BTSs 12A, 12B send data in the form of transmit signals TS to receive units 14A, 14B, 14C via wireless communications channels 22. For simplicity, only channel 22A between BTS 12A and receive unit 14A and channel 22B between BTS 12B and receive unit 14C are indicated.

Figure 2:
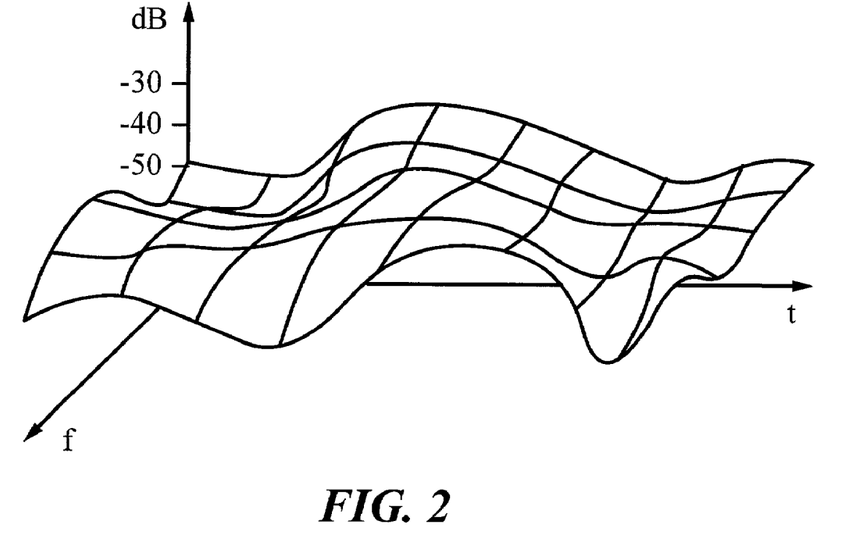
FIG. 2 is a graph illustrating the effects of channel variation in time and frequency.

The time variation of channels 22A, 22B causes transmitted signal TS to experience fluctuating levels of attenuation, interference, multi-path fading and other deleterious effects. Therefore, communication parameters of channel 22A such as data capacity, signal quality, spectral efficiency and throughput undergo temporal changes. The cumulative effects of these variations of channel 22A between BTS 12A and receive unit 14A are shown for illustrative purposes in FIG. 2. In particular, this graph shows the variation of a particular quality parameter, in this case signal strength of receive signal RS at receive unit 14A in dB as a function of transmission time t and frequency f of transmit signal TS sent from transmit unit 12A. Similar graphs can be obtained for other quality parameters, such as signal-to-interference and noise ratio (SINR), signal-to-noise ratio (SNR) as well as any other quality parameters known in the art. Of the various quality parameters signal strength (power level), SINR and SNR are generally convenient to use because they can be easily and rapidly derived from receive signals RS as is known in the art.

Figure 3:
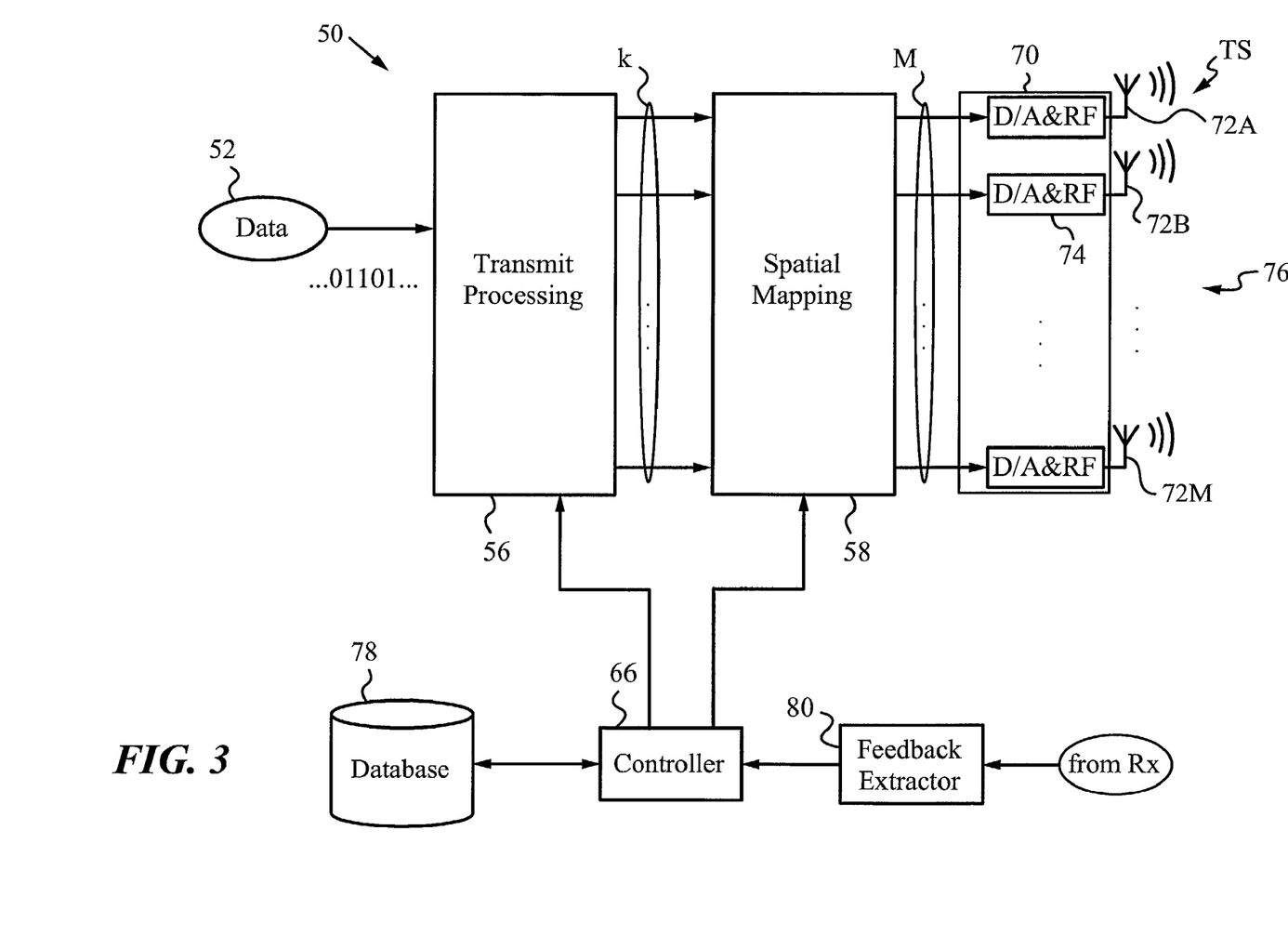
FIG. 3 is a block diagram of a transmit unit in accordance with the invention.
Figure 4:
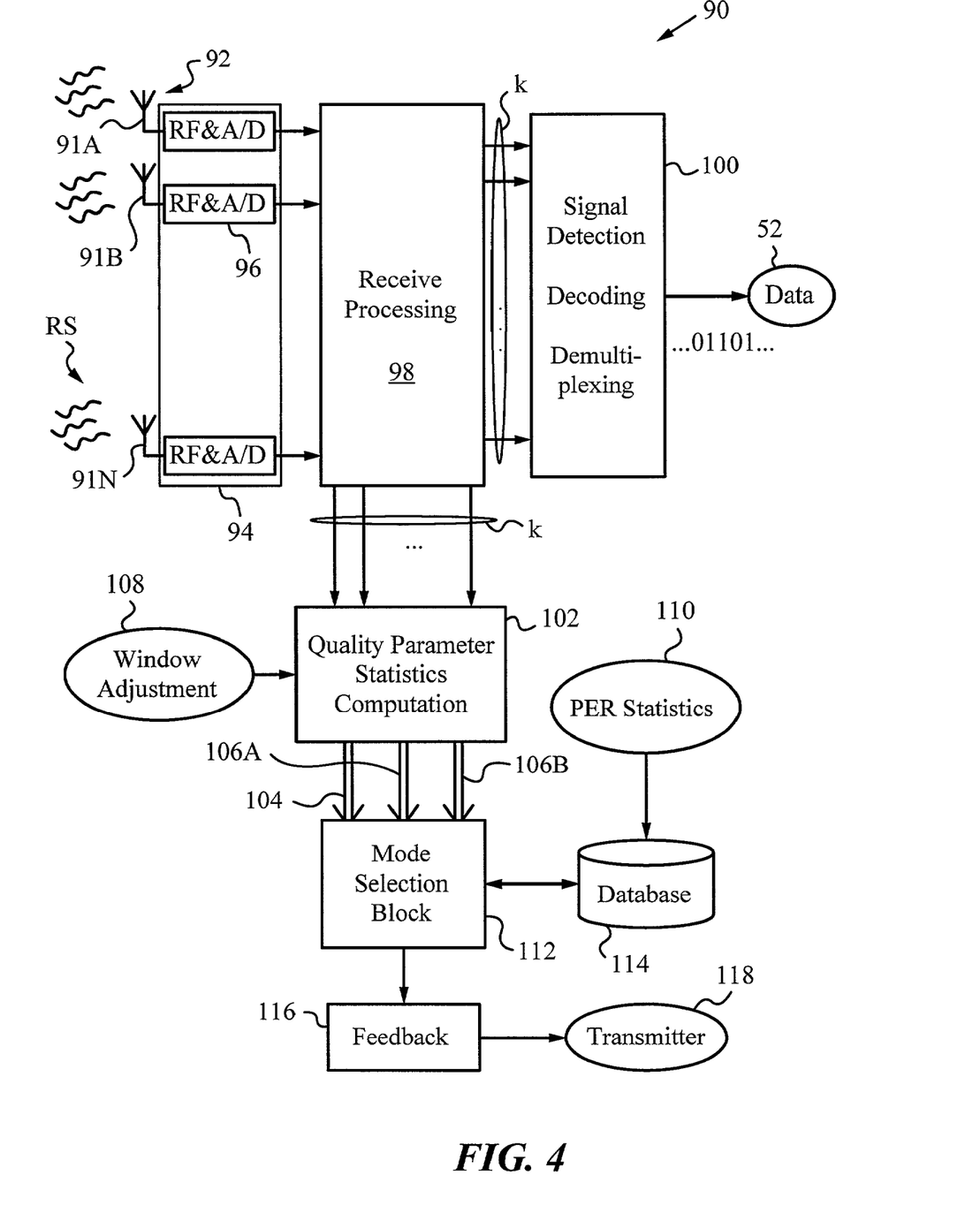
FIG. 4 is a block diagram of an exemplary receive unit in accordance with the invention.

A mode for encoding data at transmit units 14 is selected based on a first-order statistical parameter and a second-order statistical parameter of the quality parameter. The details of the method will now be explained by referring to the operation of a transmit unit 50, as illustrated in FIG. 3 and a receive unit 90 as illustrated in FIG. 4.

Transmit unit 50 receives data 52 to be transmitted; in this case a stream of binary data. Data 52 is delivered to a transmit processing block 56. Transmit processing block 56 subdivides data 52 into a number k of parallel streams. Then, processing block 56 applies an encoding mode to each of the k streams to thus encode data 52. It should be noted, that before transmission data 52 may be interleaved and pre-coded by an interleaver and a pre-coder (not shown). The purpose of interleaving and pre-coding is to render the data more robust against errors. Both of these techniques are well-known in the art.

The mode is determined by a modulation during which data 52 is mapped into a constellation at a given modulation rate, and a coding rate at which this translation is performed. For example, data 52 can be converted into symbols through modulation in a constellation selected from among PSK, QAM, GMSK, FSK, PAM, PPM, CAP, CPM or other suitable constellations.

The transmission rate or throughput of data 52 will vary depending on the modulation and coding rates used in each of the k data streams.

TABLE 1

| Mode | Modulation Rate (bits/symbol) | Coding Rate | Throughput (bits/s/Hz) |
|------|-------------------------------|-------------|------------------------|
| 1    | 2                             | 3/4         | 3/2                    |
| 2    | 2                             | 2/3         | 4/3                    |
| 3    | 2                             | 1/2         | 1                      |
| 4    | 2                             | 1/3         | 2/3                    |
| 5    | 4                             | 3/4         | 3                      |
| 6    | 4                             | 2/3         | 8/3                    |
| 7    | 4                             | 1/2         | 2                      |
| 8    | 4                             | 1/3         | 4/3                    |
| 9    | 5                             | 3/4         | 15/4                   |
| 10   | 5                             | 2/3         | 10/3                   |
| 11   | 5                             | 1/2         | 5/2                    |
| 12   | 5                             | 1/3         | 5/3                    |
| 13   | 6                             | 3/4         | 9/2                    |
| 14   | 6                             | 2/3         | 4                      |
| 15   | 6                             | 1/2         | 3                      |
| 16   | 6                             | 1/3         | 2                      |

Table 1 illustrates some typical modes with their modulation rates and coding rates and the corresponding throughputs for data 52. The modes are indexed by a mode number so as to conveniently identify the modulation and coding rates which are to be applied to data 52 in each mode. Tables analogous to Table 1 for other coding and modulation rates can be easily derived as these techniques are well-known in the art.

Referring back to FIG. 3, a set of modes, conveniently arranged in the form of a lookup table indexed as described above, are stored in a database 78 of transmit unit 50. Database 78 is connected to a controller 66, which is also connected to transmit processing block 56 and spatial mapping unit 58. Controller 66 controls which mode from database 78 is applied to each of the k streams and it also controls the spatial mapping to be performed by spatial mapping unit 58.

In addition to encoding the k streams, transmit processing block 56 adds training information into training tones T (see FIG. 5) and any other control information, as is known in the art. Thus processed, the k streams are sent to an up-conversion and RF amplification stage 70 having individual digital-to-analog converters and up-conversion/RF amplification blocks 74 through spatial mapping unit 58. Spatial mapping unit 58 maps the k streams to M inputs of the up-conversion and RF amplification stage 70. The M outputs of amplification stage 70 lead to corresponding M transmit antennas 72 of an antenna array 76.

A person skilled in the art will recognize that the number M of transmit antennas 72 does not have to be equal to the number of streams k. That is because various spatial mappings can be employed in assigning streams k to transmit antennas 72. In one mapping, a certain transmit antenna 72B transmits one of the k streams. In another mapping, a number of transmit antennas 72 transmit the same stream k. In yet another embodiment, the k streams are assigned to M antennas 72 or a subset thereof via the spatial mapping unit 58 and unit 70. In fact, any kind of mapping involving the use of spatial multiplexing (SM) and antenna diversity can be used.

Figure 5:
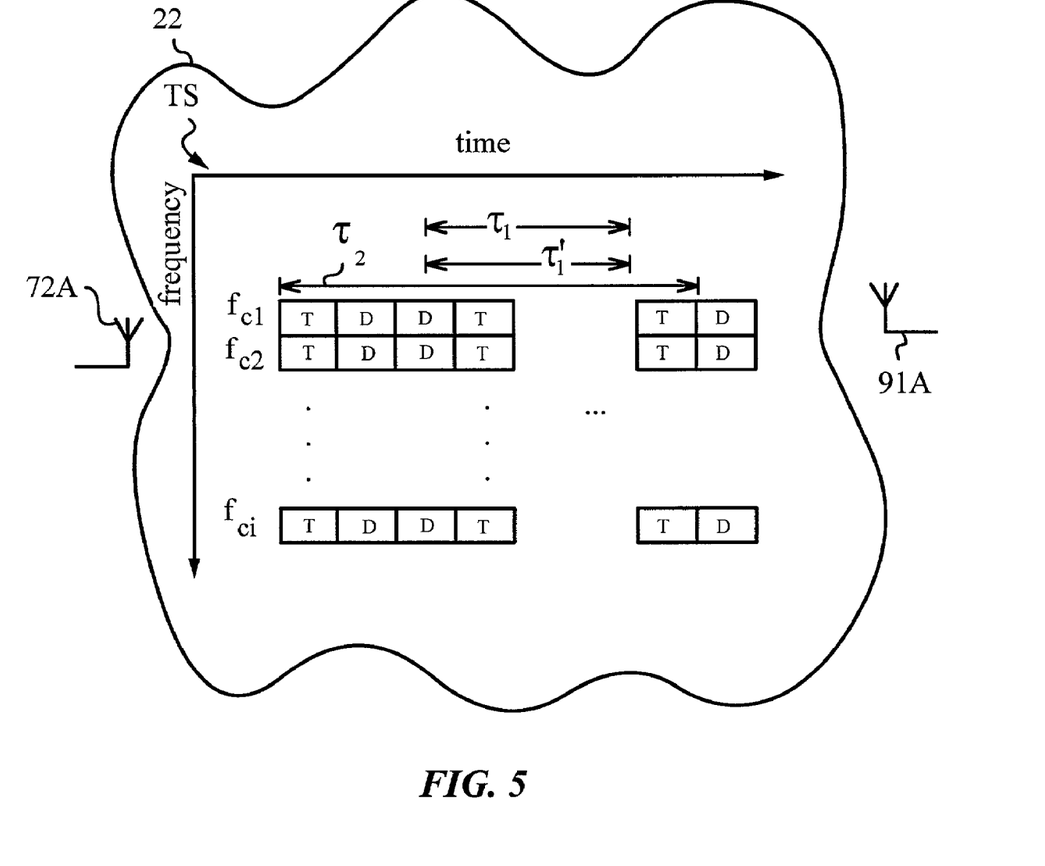
FIG. 5 is a schematic diagram illustrating data transmitted in a wireless communication channel.

Transmit antennas 72 transmit data 52 in the form of transmit signals TS. FIG. 5 illustrates, as will be recognized by those skilled in the art, a multicarrier transmission scheme with n frequency carriers (tones). The vertical axis illustrates frequency carriers while the horizontal axis illustrates OFDM symbol periods. Each block corresponds to one of n frequency carriers during an OFDM symbol. The blocks marked with D correspond to data and the blocks marked with T correspond to training. FIG. 5 indicates that training is performed on all tones during an OFDM training symbol. It will be clear to a person skilled in the art that a subset of these tones could be used for training and the corresponding frequency response could be computed at the receiver by interpolating.

Transmit signals TS propagate through channel 22 and there experience the effects of changing conditions of channel 22, as described above. Transmit signals TS are received in the form of receive signals RS by a receive antenna 91A belonging to an antenna array 92 of a receive unit 90, shown in FIG. 4.

Again referring to FIG. 4, receive unit 90 has N receive antennas 91A, 91B, . . . , 91N for receiving receive signals RS from transmit unit 50. Receive unit 90 can be any suitable receiver capable of receiving receive signals RS via the N receive antennas 92. Exemplary receivers include linear equalizer receivers, decision feedback equalizer receivers, successive cancellation receivers and maximum likelihood receivers.

Receive unit 90 has an RF amplification and down-conversion stage 94 having individual RF amplification/down-conversion and analog-to-digital converter blocks 96 associated with each of the N receive antennas 91A, 91B, . . . , 91N. The N outputs of stage 94 are connected to a receive processing block 98 which performs receive processing to recover the k streams encoded by transmit processing block 56 of transmit unit 50. The recovered k streams are passed on to a signal detection, decoding and demultiplexing block 100 for recovering data 52. In the case of antenna diversity processing it should be understood that k is equal to one and thus there is only a single stream recovered.

The receive processing block 98 computes the quality parameters for each of the k streams and sends this information to a statistics computation block for computing statistical parameters of the one or more quality parameters. The method of the invention can recognize slow and rapid channel variations and allows for efficient mode selection by taking both types of variation into account. This is accomplished by taking into account at least two statistics of one or more quality parameters. Conveniently, the quality parameter is a short-term quality parameter. Suitable short-term quality parameters include signal-to-interference and noise ratio (SINR), signal-to-noise ratio (SNR) and power level.

In the present embodiment the short-term quality parameter used is SINR. Statistics computation block 102 computes a first-order statistical parameter 104 and a second-order statistical parameter 106 of SINR. Conveniently, first-order statistical parameter 104 is mean SINR and second-order statistical parameter is a variance SINR. Variance 106 of SINR actually consists of two values, SINR temporal variance 106A and SINR frequency variance 106B. In systems which do not employ multi-carrier transmission schemes frequency variance 106B does not have to be computed. It should be noted that each data stream of the k streams will have an associated statistical parameter 104, 106A, 106B.

A window adjustment 108 such as a timing circuit is connected to statistics computation block 102. Window adjustment 108 sets a first time interval or first sampling window $\tau_1$ (see FIG. 5) during which the SINR is sampled. Conveniently, SINR is sampled during training tones T occurring during sampling window $\tau_1$.

The present embodiment uses multiple carrier frequencies $f_c$ and thus SINR is sampled and computed by block 102 for data 52 transmitted at each of the n carrier frequencies $f_c$. By buffering the SINR values for all the training tones T during time window $\tau_1$ statistics computation block 102 constructs the following matrix:

$$\begin{bmatrix} SINR_{1,1} & SINR_{1,2} & \ldots & SINR_{1,w} \\ SINR_{2,1} & \ldots & & \\ \ldots & & & \\ SINR_{n,1} & & & SINR_{n,w} \end{bmatrix}$$

where $SINR_{i,j}$ is the SINR at the i-th carrier frequency $f_{ci}$ during training phase j. There are thus 1 to n carrier frequencies $f_c$ and 1 to w training phases.

First-order statistical parameter 104 of short-term quality parameter, in this case mean SINR, can be expressed as:

$$SINR_{mean} = \frac{1}{n \cdot w} \sum_{i=1}^{n} \sum_{j=1}^{w} SINR_{i,j}.$$

Second-order statistical parameters 106A, 106B of short-term quality parameter, in this case SINR frequency variance and SINR temporal variance can be expressed as:

$$SINR_{var(freq)} = \frac{1}{n \cdot w} \sum_{i=1}^{w} \sum_{j=1}^{n} \left[ SINR_{j,i} - \frac{1}{n} \sum_{k=1}^{n} SINR_{k,i} \right]^2, \text{ and}$$

$$SINR_{var(time)} = \frac{1}{w} \sum_{k=1}^{w} \left[ \frac{1}{n} \sum_{i=1}^{n} SINR_{i,k} - (SINR_{mean}) \right]^2.$$

In general, the duration of first sampling window $\tau_1$ takes into account general parameters of the communication system and/or channel 22. For example, channel 22 has a coherence time during which the condition of channel 22 is stable. Of course, the coherence time will vary depending on the motion of receive unit 90, as is known in the art. In one embodiment, window adjustment 108 sets first sampling window $\tau_1$ based on the coherence time. Specifically, first sampling window $\tau_1$ can be set on the order of or shorter than the coherence time. Thus, the first- and second-order statistical parameters 104, 106A, 106B computed during time window $\tau_1$ are minimally affected by loss of coherence. In another embodiment window adjustment 108 sets first sampling window $\tau_1$ to be much larger than the coherence time.

Alternatively, window adjustment 108 sets first sampling window $\tau_1$ on the order of or equal to a link update time or a delay time. This is the amount of time required for receive unit 90 to communicate to transmit unit 50 the SINR statistics and/or the appropriate mode selection based on these SINR statistics as explained below. The delay time is a design parameter limited by the complexity of computations involved and feedback from receive unit 90 to transmit unit 50. Of course, the delay time of the system should preferably be less or significantly less than the channel coherence time. On the converse, when the delay time of the system is greater than channel coherence time the window size $\tau_1$ should also be chosen appropriately to be larger than the channel coherence time. In any case, it should be noted that the first-order and second-order statistics of the short-term quality parameter, in the present case mean and variance of SINR, should be sampled and computed over sampling windows of the same window length.

In addition to the above computations, receive unit 90 also computes a communication parameter, in this embodiment an error rate of data 52. For example, receive unit 90 computes a bit error rate (BER) or a packet error rate (PER) of data 52. It typically takes a much longer period of time than the length of first sampling window τhd 1 to compute these error rates. Conveniently, these error rates are thus computed during second sampling window $\tau_2$ or over an error rate computation time (see FIG. 5). The computation of these error values and circuits necessary to perform these computations are well known in the art.

It should be noted that first-order and second-order statistics of the communication parameters should be sampled over just one window length, i.e., second sampling window $\tau_2$. In the present embodiment only first-order statistic of the communication parameter, mean PER is computed during second time window $\tau_2$. As is well known in the art, the packet error rate can be computed by keeping track of the cyclic redundancy check (CRC) failures on the received packets. PER computation is a well-known technique and is performed in this embodiment by a PER statistics circuit 110. The PER computation can be used to further improve mode selection from the lookup table of the invention by providing correction factors or adjustments, as described below.

The first- and second-order statistical parameters of the short-term quality parameter 104, 106A, 106B are delivered from statistics computation block 102 to a mode selection block 112. Mode selection block 112 is connected to a database 114, conveniently containing the same modes as database 78 of transmit unit 50. The set of modes in database 114 is related to first-order statistical parameter 104 and second-order statistical parameters 106A, 106B of short-term quality parameter. When used, PER statistics circuit 110 is also connected to database 114 and delivers the PER statistics to it.

Block 112 selects the subsequent mode number for encoding data 52. Block 112 is connected to a feedback block 116 and a corresponding transmitter 118 for transmission of the feedback to transmit unit 50. Here the convenience of indexing modes becomes clear, since feedback of an index number to transmit unit 50 does not require much bandwidth. It should be noted, that in the present embodiment a mode selection is made for each of the k streams. In other words, a mode index indicating the mode to be used for each of the k streams is fed back to transmit unit 50. In another embodiment, it may be appropriate to send a mode difference indicating how to modify the current mode for subsequent transmission. For example, if the current transmission is mode 1, and the mode index of the subsequent mode is 3, the mode difference would be 2. In yet another embodiment, it may be suitable to send the channel characteristics back to transmit unit 50. In this case the computation of statistics of the quality parameter and the mode selection are performed at transmit unit 50.

Referring back to FIG. 3, transmit unit 50 receives feedback from receive unit 90 via a feedback extractor 80. Feedback extractor 80 detects the mode index or any other designation of the selected modes for each of the k streams and forwards this information to controller 66. Controller 66 looks up the mode by mode index in database 78 and thus determines the modulation, coding rate and any other parameters to be used for each of the k streams. In the event of using time-division duplexing (TDD), which is a technique known in the art, the quality parameters can be extracted during the reverse transmission from receive unit 90 or remote subscriber unit and no dedicated feedback is required.

In one embodiment, when the system of invention is placed into operation, transmit processing block 56 first assigns an initial mode, e.g., one of the modes available in the set of modes stored in database 78 to each of the k streams. The choice of initial modes can be made on previously known data, simulations or empirical results. Transmit unit 50 then transmits data 52 in the form of transmit signals TS to receive unit 90.

Receive unit 90 receives receive signals RS, reconstructs data 52 therefrom, and computes first-order and second-order statistical parameters 104, 106A, 106B of short-term quality parameter. Mode selection block 112 then selects from database 114 the subsequent mode based on parameters 104, 106A, 106B.

In accordance with the present invention, the modes from which the initial mode and subsequent modes are chosen are arranged in a lookup table of modes constructed based on first-order and second-order statistical parameters of at least one of the quality parameters indicating the quality of data 52 at receive unit 90. In the present embodiment the first-order and second-order statistics of SINR are used to construct the lookup table.

Figure 6:
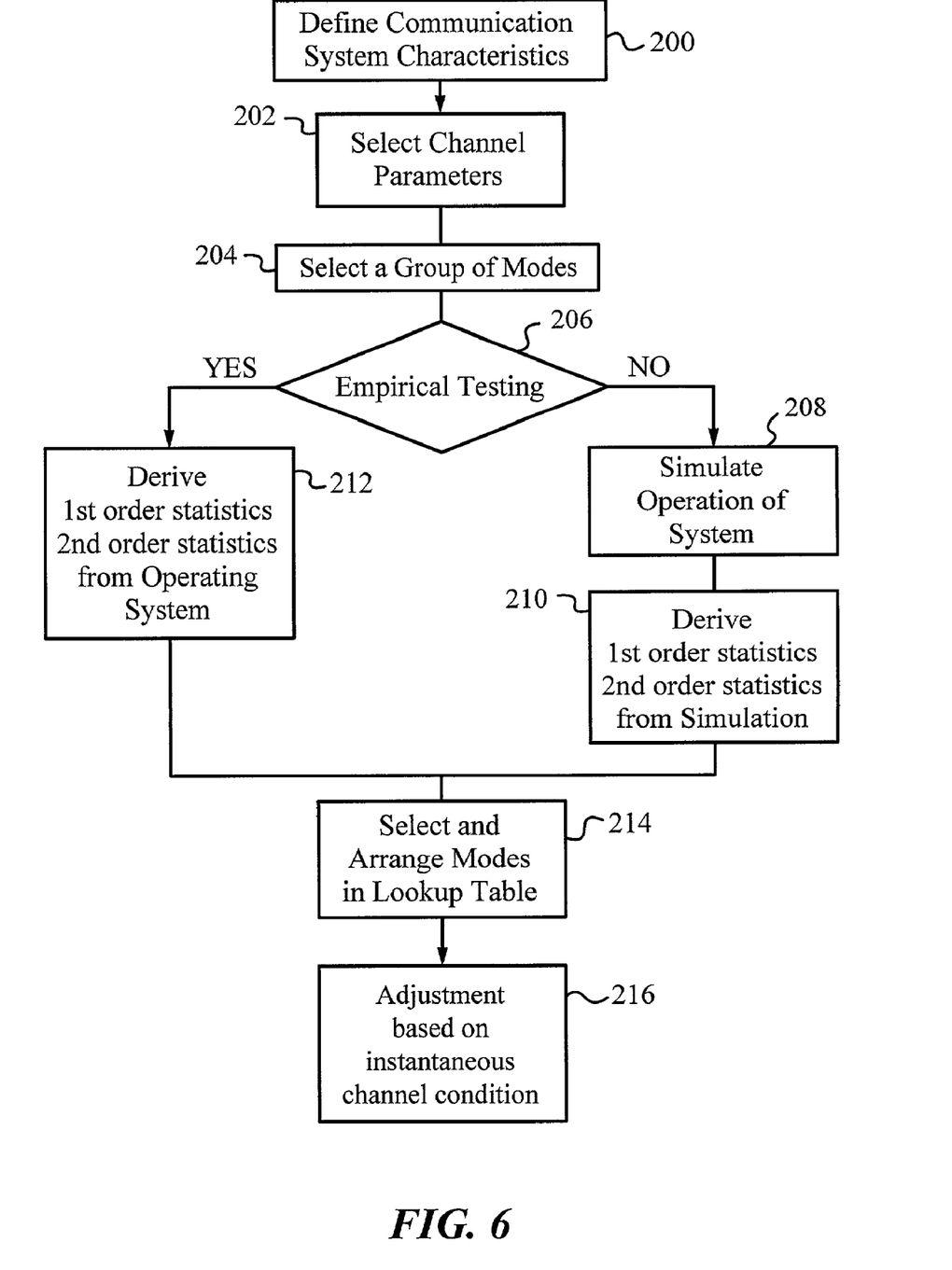
FIG. 6 is a flow diagram illustrating the construction of a lookup table based on first-order and second-order statistical parameters in accordance with the invention.

The flow diagram in FIG. 6 illustrates two ways of constructing and using the lookup table. In a common first step 200 the communication system characteristics are defined. In the present embodiment, these parameters include the number M of transmit antennas 72, the number N of receive antennas 91, the type of mapping of the k streams to transmit antennas 72 performed by spatial mapping unit 58 and the polarizations of antennas 72, 91. In some cases additional characteristics relating to transmit and receive processing of data 52 should also be specified. In fact, any communication system characteristics which affect the relationship between the first-order and second-order statistical parameters, in this case SINR mean and SINR variance, and the communication parameter, in this case mean PER, should be included as communication system characteristics.

In a second step 202 the parameters of channel 22 are selected. These parameters are related to the environment (e.g., rural, urban or suburban) in which the communication system is deployed. The parameters of channel 22 can include correlations of receive antennas 91, correlations of transmit antennas 72, Doppler spread, delay spread, Rician k factor, cross pole discrimination values and any other parameters which help to predict the behavior of channel 22.

In a third step 204 selected parameters of channel 22 and the system characteristics are used to select a group of modes which can be used by the system. In the present embodiment, it is convenient to select all modes which can be differentiated or ordered by their first- and second-order SINR statistics and first-order PER statistics. This group can be limited to a subset of modes which are likely to yield good transmission performance. For example, one can select from the group of all modes those which promise to yield good performance given channel 22 and system characteristics. In particular, one can select modes which promise to maximize a communication parameter or combination of communication parameters such as BER, PER, data capacity, signal quality, spectral efficiency and throughput. It is important to select a set of modes with different radio interface rates (spectral efficiency) and robustness, so that each mode is optimal for use in different link quality regions. In this way, there is a mode available for the various likely conditions of channel 22. As is well-known in the art, spectral efficiency is a function of the modulation used, and robustness is a function of the coding rate used.

The first alternative in constructing the lookup table involves simulation of system operation rather than empirical testing. In other words, in constructing the lookup table first-order and second-order statistical parameters can be determined from a simulation of the wireless communication channel or from field measurements of the wireless communication channel. In the former case the answer in step 206 is "no" and in the subsequent step 208 a system simulator is set up. The simulator is based on system characteristics defined in step 200 and parameters of channel 22 defined in step 202.

Figure 7:
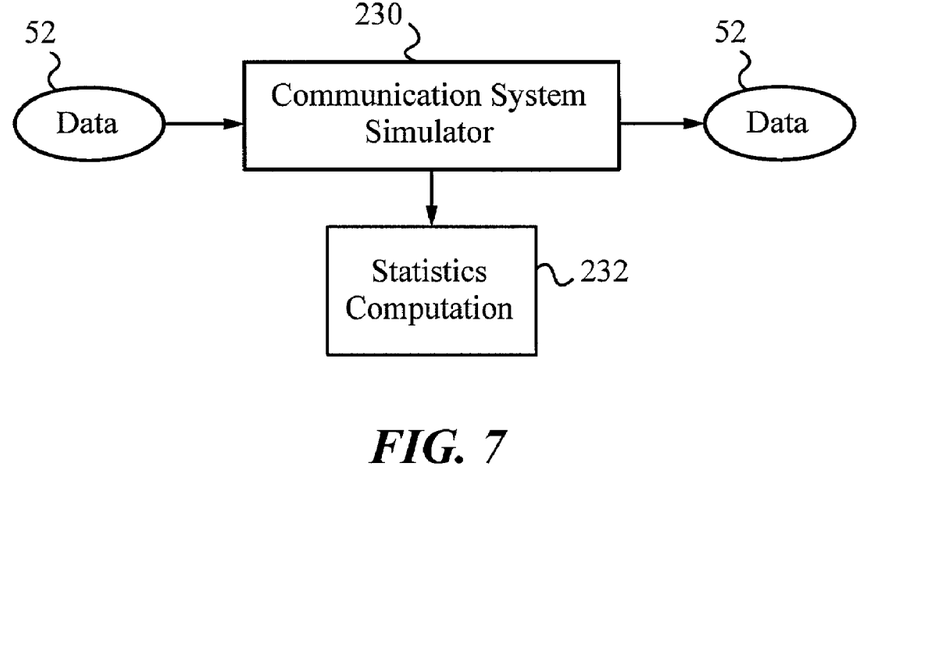
FIG. 7 is a simplified block diagram of a simulator.

A simplified block diagram of a simulator 230 is shown in FIG. 7. Data 52 is processed by simulator 230 to simulate transmission from transmit unit 50 via channel 22 to receive unit 90. The output of simulator 230 is data 52 as recovered by receive unit 90, i.e., data 52 with errors. A statistics computation block 232 connected to simulator 230 calculates the error statistics of data 52. Additionally, statistics computation block 232 computes first-order and second-order statistical parameters of the at least one quality parameter, in this case SINR mean and variance. Also, statistics computation block 232 conveniently computes the communication parameter, in this case mean PER, which represents a statistical communication parameter.

Referring back to the flow diagram of FIG. 6, the first- and second-order statistical parameters computed by block 232 are obtained in step 210. In the second alternative to constructing the lookup table the answer in step 206 is "yes" and empirical or field testing is performed in step 212 on data 52 transmitted through channel 22 in the actual system to determine the first- and second-order statistical parameters. Again, the first-order and second-order statistical parameters of SINR are determined, and, conveniently, the statistical communication parameter in the form of mean PER is also determined in step 212.

The statistical parameters derived either from the actual system in step 212 or from simulation in step 210 are used to select and arrange the modes in a lookup table in step 214. An exemplary lookup table for the present embodiment is shown below. It should be noted that for the purposes of this description, the below system of cross-referenced tables or sub-tables is considered to represent the lookup table.

SUB-TABLE 1

| SINR variance (frequency) | SINR variance (temporal) | Sub-Table to use |
|---|---|---|
| 0 dB | 0 dB | A |
| 0 dB | 5 dB | B |
| 0 dB | 10 dB | C |
| 0 dB | 15 dB | D |
| 0 dB | 20 dB | E |
| 5 dB | 0 dB | B |
| 5 dB | 5 dB | C |
| 5 dB | 10 dB | D |
| 5 dB | 15 dB | E |

SUB-TABLE 1-continued

| SINR variance (frequency) | SINR variance (temporal) | Sub-Table to use |
|---|---|---|
| 5 dB | 20 dB | F |
| 10 dB | 0 dB | C |
| 10 dB | 5 dB | D |
| 10 dB | 10 dB | E |
| 10 dB | 15 dB | F |
| 10 dB | 20 dB | F |
| 15 dB | 0 dB | D |
| 15 dB | 5 dB | E |
| 15 dB | 10 dB | F |
| 15 dB | 15 dB | F |
| 15 dB | 20 dB | F |
| 20 dB | 0 dB | E |
| 20 dB | 5 dB | F |
| 20 dB | 10 dB | F |
| 20 dB | 15 dB | F |
| 20 dB | 20 dB | F |

SUB-TABLE C

| PER mean | SINR mean | Mode |
|---|---|---|
| 1% | 0 dB | mode 1 |
| 2% | | mode j |
| 3% | | mode k |
| 4% | | mode l |
| ≧5% | | mode m |
| 1% | 2 dB | mode j |
| 2% | | mode k |
| 3% | | mode l |
| 4% | | mode m |
| ≧5% | | mode n |
| 1% | 4 dB | mode k |
| 2% | | mode l |
| 3% | | mode m |
| 4% | | mode n |
| ≧5% | | mode o |
| 1% | 6 dB | mode l |
| 2% | | mode m |
| 3% | | mode n |
| 4% | | mode o |
| ≧5% | | mode p |
| 1% | 8 dB | mode m |
| 2% | | mode n |
| 3% | | mode o |
| 4% | | mode p |
| ≧5% | | mode r |
| . | . | . |
| . | . | . |
| . | . | . |

Sub-tables 1 and C illustrate a portion of the lookup table in which modes are arranged to conveniently determine the mode to be used in encoding data 52 based on the frequency and temporal variance of SINR (second-order statistical parameters of short-term quality parameter), mean SINR (first-order statistical parameter of short-term quality parameter) and mean PER (statistical communication parameter). Sub-Table 1 is referenced to tables A, B, C, D, E and F (only Sub-Table C shown) based on frequency and temporal variances 106A, 106B of SINR.

For example, the third entry in Sub-Table 1 corresponds to situations where SINR frequency and temporal variances are 0 dB and 10 dB respectively. In this situation Sub-Table C is used in further mode selection. Sub-Table C is organized by the statistical parameter or mean PER and mean SINR (first-order statistical parameter of short-term quality parameter). The mean PER values are actually target values. The quality of service required usually dictates the target value. For example, in high-quality data transmissions the target value is set very low, while in lower quality voice transmissions a higher target value is set.

The modes in the lookup table are arranged based on the first and second-order statistical parameters and the corresponding target value of the communication parameter. The target values of PER are related to mean SINR in Sub-Table C and to frequency and temporal variances of SINR in Sub-Table 1. In other words, a mapping or correspondence is established in the lookup table between PER target values and the first and second-order statistical parameters of the quality parameter. Each of these mappings has associated with it a corresponding mode to be used in encoding data 52, here indicated as modes i,j, . . . r.

Once arranged in the manner described, the lookup table is ready for use. The quality of service (QoS) is defined in terms of the target value for mean PER at which the requisite user services (e.g., voice communication) can be supported. When the conditions of channel 22 and of the communication system are close to those simulated or obtained in field test the lookup table can be used directly to select the appropriate mode corresponding to the target PER and SINR statistics. More commonly, however, the selection of modes may have to be modified depending on the actual or instantaneous condition of the wireless communication channel 22 or changes to the communication system. Again, this is because the lookup table is constructed based on a finite number of simulation samples, or using particular channel models, or using field measurements of a particular wireless channel, as noted above. The mean PER target values may thus no longer correspond to the mean SINR and SINR frequency and temporal variances as mapped in the lookup table.

Once the lookup table is created, it is stored in database 114 (or in both databases 114 and 78) and the system is deployed in the field. Because the lookup system was created with a finite number of simulation samples or using particular channel models, there is a possibility that the mapping it contains between the SINR statistical parameters and the target value of PER becomes inaccurate, once deployed in the field. The mapping is conveniently corrected or modified based on the difference between the target value of PER and the measured value of PER in actual operation. For this purpose it is convenient to define an accuracy bound or interval about the target value of PER. For example, when the target value of PER is 3%, the interval may be defined between 2.5% and 3.5%. When the measured value of PER goes above the upper bound of the interval, i.e., $PER_{meas} > 3.5\%$, then a positive correction factor or adjustment $\delta$ is applied to the required SINR levels in the lookup table. On the other hand, when the measured value of PER goes below the lower bound of the interval a negative adjustment $-\delta$ is applied to the required SINR levels in the lookup table. After a few rounds of PER measurements the lookup table is thus automatically adjusted to the particular field channel parameters and now provides accurate short term mode selection. This adjustment of the lookup table is indicated in step 216 in the diagram of FIG. 6. As noted above, the measurement of PER can be performed by PER statistics circuit 110.

Of course, the communication parameter does not have to be PER. In another embodiment, the lookup table is built up on a mapping between BER and SINR statistics. The structure of the lookup table is analogous to the one described above where PER and its target value were used in mode selection.

Figure 8:
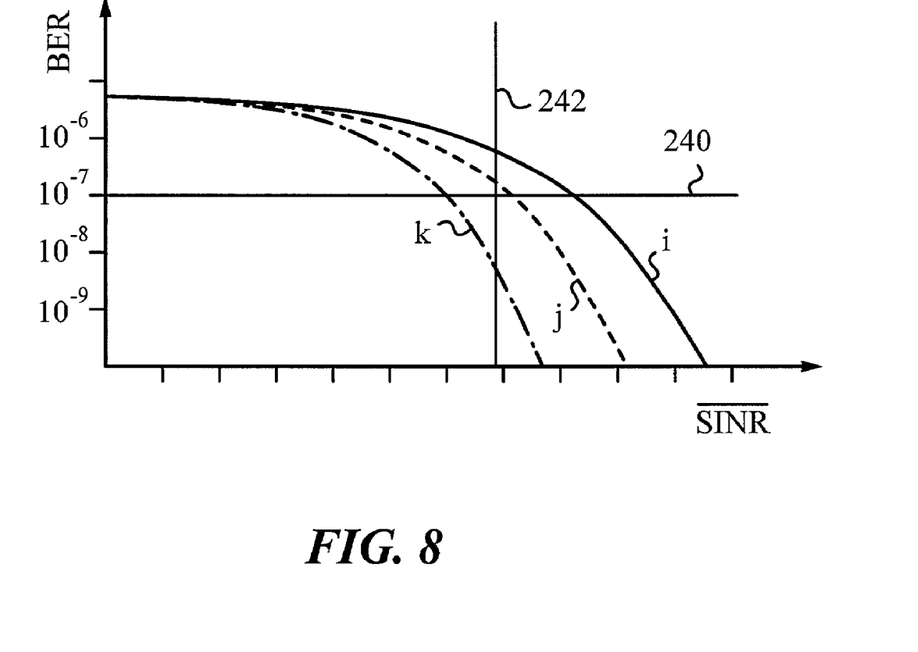
FIG. 8 is a graph illustrating first-order and two second-order statistical parameters for three modes.

FIG. 8 is a graph illustrating BER versus first-order statistics of short-term quality parameter (SINR mean) for a given second-order statistics of the short-term quality parameter (SINR variances). It is understood that a complete set of such curves is provided for different values of second-order statistics of SINR. Only three modes i, j, k are shown for reasons of clarity, but it is apparent that all modes in the lookup table should be examined. Specifically, the target value of BER set is indicated in the graphs by BER by cut-off line 240. The measured value of mean SINR in channel 22 is indicated by upper bound 242. Based on the mean SINR versus BER curves only mode k is able to support the required BER. In fact, this approach of studying the performance of the communication parameter as a function of SINR statistics, including the remaining frequency and temporal variances, is a convenient method which a person of average skill in the art will be able to use in the construction of the lookup table.

Once the lookup table is constructed and organized as described above it is most conveniently stored in databases 114 and 78. The lookup table will not change with time because of changing conditions of channel 22; rather adjustments $\delta$ will allow the user to adjust the lookup table to its particular field channel parameters. It is also convenient to store the above-described steps for constructing and organizing the table. For example, the steps or method of constructing and organizing the lookup table can be stored in the form of a computer-implemented program in the same storage medium as the lookup table itself in database 117 or 78 or both. Alternatively, mode selection block 112 can contain the program in its memory. In yet another embodiment, the program can reside in controller 66 of transmit unit 50.

During operation mode selection block 112 takes advantage of the lookup table in determining and assigning the modes to each of the k streams. These mode selections are fed back to transmit unit 50 and applied to the k streams. The operation repeats itself, and each new selection of subsequent modes is fed back to transmit unit 50 to thus account for the changing conditions of channel 22.

A person skilled in the art will recognize that numerous alternatives exist to the embodiments described above. For example, the communication parameter can be a data capacity, signal quality, spectral efficiency, throughput or another suitable communication parameter. In fact, the communication parameter can be any suitable statistical measure of the quality of data transmission through the wireless communication channel. The method and system of invention can be used to construct lookup tables of modes useful in any data transmission technique such as OFDMA, FDMA, CDMA, TDMA.

It will thus be clear to one skilled in the art that the above embodiments may be altered in many ways without departing from the scope of the invention. Accordingly, the scope of the invention should be determined by the following claims and their legal equivalents.

What is claimed is:

1. A method of constructing a lookup table of modes for encoding data for transmission in a wireless communication channel from a transmit unit to a receive unit, said method comprising:
   a) selecting at least one short-term quality parameter associated with the communication channel as received by said receive unit;
   b) determining a first-order statistical parameter of said at least one quality parameter;
   c) determining a second-order statistical parameter of said at least one quality parameter; and d) arranging said modes in said lookup table based on said first-order statistical parameter and based on said second-order statistical parameter.

2. The method of claim 1, wherein said first-order statistical parameter and said second-order statistical parameter are determined from a simulation of said wireless communication channel.

3. The method of claim 1, wherein said first-order statistical parameter and said second-order statistical parameter are determined from a field measurement of said wireless communication channel.

4. The method of claim 1, further comprising:
  a) selecting a communication parameter;
  b) setting a target value of said communication parameter; and
  c) arranging said modes in said lookup table based on said target value.

5. The method of claim 4, wherein said communication parameter is a statistical communication parameter.

6. The method of claim 4, further comprising:
  a) measuring a measured value of said communication parameter in said wireless communication channel;
  b) assigning an adjustment to at least one of said first-order statistical parameter and said second-order statistical parameter based on a difference between said measured value and said target value.

7. The method of claim 1, wherein said second-order statistical parameter comprises a variance of said short-term quality parameter.

8. The method of claim 7, wherein said variance is selected from the group consisting of temporal variance and frequency variance.

9. The method of claim 1, wherein said short-term quality parameter is selected from the group consisting of signal-to-interference and noise ratio, signal-to-noise ratio and power level.

10. The method of claim 1, wherein said first-order statistical parameter comprises a mean of said at least one quality parameter.

11. The method of claim 1, wherein said second-order statistical parameter comprises a variance of said at least one quality parameter.

12. The method of claim 11, wherein said data is transmitted at more than one frequency and said variance is a frequency variance.

13. The method of claim 11, wherein said data is transmitted in a multi-carrier scheme and said variance is a frequency variance.

14. The method of claim 11, wherein said variance is a temporal variance.

15. A storage medium tangibly embodying a lookup table of modes for encoding data for transmission in a wireless communication channel from a transmit unit to a receive unit, said storage medium comprising instructions for:
  a) selecting at least one short term quality parameter associated with the communication channel as received by said receive unit;
  b) determining a first-order statistical parameter of said at least one quality parameter;
  c) determining a second-order statistical parameter of said at least one quality parameter; and
  d) arranging said modes in said lookup table based on said first-order statistical parameter and based on said second-order statistical parameter.

16. The storage medium of claim 15, further comprising instructions for:
  a) selecting a communication parameter;
  b) setting a target value of said communication parameter; and
  c) arranging said modes in said lookup table based on said target value.

17. The storage medium of claim 16, further comprising instructions for:
  a) measuring a measured value of said communication parameter in said wireless communication channel; and
  b) assigning an adjustment to at least one of said first-order statistical parameter and said second-order statistical parameter based on a difference between said measured value and said target value.

18. A storage medium according to claim 15, wherein the second-order statistical parameter is a variance of the quality parameter.

19. A storage medium according to claim 18, wherein the communication channel is a multi-carrier communication channel, and the second-order statistical parameter is a frequency variance of the quality parameter.

20. A receiver comprising:
  a quality parameter statistics computation block to select at least one short-term quality parameter associated with the communication channel as received by said receive unit, to determine a first-order statistical parameter of said at least one quality parameter, and to determine a second-order statistical parameter of said at least one quality Parameter; and
  a mode selection block, responsive to the Quality parameter statistics computation block, to arrange said modes in said lookup table based on said first-order statistical parameter and based on said second-order statistical parameter.

21. A receiver according to claim 20, wherein the receiver resides in a client device communicatively coupled to a wireless communications network through a multi-carrier communication channel.

22. A receiver according to claim 21, wherein the second-order statistical parameter is a frequency variance of the multi-carrier wireless communication channel.

23. A receiver according to claim 21, wherein the mode selection block selects a communication parameter, generates a target value of said communication parameter, and arranges the modes in said lookup table based on said target value.

24. A receiver according to claim 23, wherein the mode selection block measures a value of said communication parameter in said wireless communication channel, and develops an adjustment to at least one of said first-order statistical parameter and said second-order statistical parameter based on a difference between said measured value and said target value.

25. A system comprising:
  one or more substantially omnidirectional antennae(e), through which a wireless communication channel with a remote device is selectively established;
  a quality parameter statistics computation block, responsive to the communication channel received via the antenna(e), to select at least one short-term quality parameter associated with the communication channel as received by said receive unit, to determine a first-order statistical parameter of said at least one quality parameter, and to determine a second-order statistical parameter of said at least one quality parameter; and a mode selection block, responsive to the quality parameter statistics communication block, to arrange said modes in said lookup table based on said first-order statistical parameter and based on said second-order statistical parameter.

26. A system according to claim 25, wherein the communication channel is a multi-carrier communication channel.

27. A system according to claim 26, wherein the second-order statistical parameter is a frequency variance of the multi-carrier wireless communication channel.

28. A system according to claim 25, wherein the mode selection block selects a communication parameter, generates a target value of said communication parameter, and arranges the modes in said lookup table based on said target value.

29. A system according to claim 28, wherein the mode selection block measures a value of said communication parameter in said wireless communication channel, and develops an adjustment to at least one of said first-order statistical parameter and said second-order statistical parameter based on a difference between said measured value and said target value.

* * * * *